US012583329B2

(12) United States Patent (10) Patent No.: US 12,583,329 B2

Nagayoshi et al. (45) Date of Patent: Mar. 24, 2026

(54) POWER CONVERSION DEVICE

(71) Applicants:KABUSHIKI KAISHA TOYOTA JIDOSHOKKI, Aichi-ken (JP); NATIONAL UNIVERSITY CORPORATION NAGAOKA UNIVERSITY OF TECHNOLOGY, Niigata-ken (JP)

(72) Inventors: Kenichi Nagayoshi, Kariya (JP); Takehiko Sumida, Kariya (JP); Junichi Itoh, Nagaoka (JP); Hiroki Watanabe, Nagaoka (JP)

(73) Assignees: KABUSHIKI KAISHA TOYOTA JIDOSHOKKI, Aichi-Ken (JP); NATIONAL UNIVERSITY CORPORATION NAGAOKA UNIVERSITY OF TECHNOLOGY, Niigata-Ken (JP)

( * ) Notice: Subject to any disclaimer, the term of this patent is extended or adjusted under 35 U.S.C. 154(b) by 0 days.

(21) Appl. No.: 18/965,283

(22) Filed: Dec. 2, 2024

(65) Prior Publication Data

US 2025/0187449 A1 Jun. 12, 2025

(30) Foreign Application Priority Data

Dec. 7, 2023 (JP) ................................. 2023-207070

(51) Int. Cl.
 *B60L 15/00* (2006.01)
 *H02M 1/00* (2006.01)
 *H02M 3/335* (2006.01)

(52) U.S. Cl.
 CPC ......... *B60L 15/007* (2013.01); *H02M 1/0095* (2021.05); *H02M 3/33573* (2021.05); *B60L 2210/10* (2013.01); *B60L 2210/30* (2013.01)

(58) Field of Classification Search
 CPC .............. B60L 15/007; B60L 2210/10; B60L 2210/30; B60L 58/20; B60L 53/22;
 (Continued)

(56) References Cited

U.S. PATENT DOCUMENTS

2022/0166314 A1* 5/2022 Chen ................... H02M 3/1584
2022/0286061 A1* 9/2022 Hayashi ............... H02M 3/158
(Continued)

FOREIGN PATENT DOCUMENTS

EP 4489285 A1 * 1/2025 ........ H02M 3/33571
JP 2022-67247 A 5/2022

*Primary Examiner* — Daniel Cavallari
(74) *Attorney, Agent, or Firm* — Greenblum & Bernstein, P.L.C.

(57) ABSTRACT

A power conversion device includes a primary-side circuit, a first connection line and a second connection line, a first capacitor provided on the first connection line, a second capacitor provided on the second connection line, a secondary-side circuit. The secondary-side circuit includes a first leg and a second leg. The first leg includes a first coil and a first diode, which are connected in series to each other. The second leg includes a second coil and a second diode, which are connected in series to each other. An anode terminal of the first diode and an anode terminal of the second diode are electrically connected to a negative one of the two output ends. A cathode terminal of the first diode is electrically connected to the first coil. A cathode terminal of the second diode is electrically connected to the second coil.

6 Claims, 11 Drawing Sheets

(58) Field of Classification Search
    CPC ........... H02M 1/0095; H02M 3/33573; H02M
                1/007; H02M 1/10; H02M 3/158; H02M
                7/217; H02M 1/08; H02M 3/01; H02M
                3/156; H02M 3/33571; H02J 7/02; H02J
                                                2207/20
    See application file for complete search history.

(56)                    References Cited

U.S. PATENT DOCUMENTS

2023/0396178  A1     12/2023  Hirai et al.
2025/0091453  A1*     3/2025  Nagayoshi .............. B60L 50/66

* cited by examiner

POWER CONVERSION DEVICE

CROSS-REFERENCE TO RELATED APPLICATIONS

This application is based upon and claims the benefit of priority from prior Japanese Patent Application No. 2023-207070, filed on Dec. 7, 2023, the entire contents of which are incorporated herein by reference.

BACKGROUND

1. Field

The present disclosure relates to a power conversion device.

2. Description of Related Art

Japanese Laid-Open Patent Publication No. 2022-67247 discloses a power conversion device that includes a primary-side circuit, a secondary-side circuit, a first connection line and a second connection line that connect the primary-side circuit and the secondary-side circuit to each other, a first capacitor provided on the first connection line, a second capacitor provided on the second connection line, a third connection line, an excitation inductor, and a control unit. The third connection line is provided closer to the secondary-side circuit than the first capacitor and the second capacitor, and connects the first connection line and the second connection line to each other. The excitation inductor is provided on the third connection line. The primary-side circuit includes switching elements. The primary-side circuit converts input power into AC power through switching operations of the switching elements at a predetermined switching frequency. The secondary-side circuit converts AC power input via the first connection line and the second connection line into DC power. The primary-side circuit and the secondary-side circuit are insulated from each other by a first capacitor and a second capacitor. The control unit controls the switching frequency, the duty cycle of the switching elements, or the phase. The control unit thus controls the output voltage.

A power conversion device that insulates a primary-side circuit and a secondary-side circuit from each other using capacitors may be required to further decrease the output voltage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power conversion device includes a primary-side circuit that includes a switching element and is configured to convert power received by a switching operation of the switching element into AC power before outputting the AC power, a first connection line and a second connection line, a first capacitor provided on the first connection line, a second capacitor provided on the second connection line, and a secondary-side circuit configured to convert AC power received from the primary-side circuit into DC power and output the DC power to two output ends. The first connection line and the second connection line each include a first end electrically connected to the primary-side circuit and a second end electrically connected to the secondary-side circuit. The secondary-side circuit includes a first leg, a second leg, a first wire, and a second wire. The first leg includes a first coil and a first diode that are connected in series to each other. The second end of the first connection line is connected to a connection point between the first coil and the first diode. The second leg includes a second coil and a second diode that are connected in series to each other. The second end of the second connection line is connected to a connection point between the second coil and the second diode. The first wire connects the first coil and the second coil to one of the two output ends. The second wire connects the first diode and the second diode to the other one of the two output ends. An anode terminal of the first diode and an anode terminal of the second diode are electrically connected to a negative one of the two output ends. A cathode terminal of the first diode is electrically connected to the first coil. A cathode terminal of the second diode is electrically connected to the second coil.

In another general aspect, a power conversion device includes a primary-side circuit that includes a switching element and is configured to convert power received by a switching operation of the switching element into AC power before outputting the AC power, a first connection line and a second connection line, a first capacitor provided on the first connection line, a second capacitor provided on the second connection line, and a secondary-side circuit configured to convert AC power received from the primary-side circuit into DC power and output the DC power to two output ends. The first connection line and the second connection line each include a first end electrically connected to the primary-side circuit and a second end electrically connected to the secondary-side circuit. The secondary-side circuit includes a first leg, a second leg, a first wire, and a second wire. The first leg includes a first coil and a first diode that are connected in series to each other. The second end of the first connection line is connected to a connection point between the first coil and the first diode. The second leg includes a second coil and a second diode that are connected in series to each other. The second end of the second connection line is connected to a connection point between the second coil and the second diode. The first wire connects the first coil and the second coil to one of the two output ends. The second wire connects the first diode and the second diode to the other one of the two output ends. A cathode terminal of the first diode and a cathode terminal of the second diode are electrically connected to a positive one of the two output ends. An anode terminal of the first diode is electrically connected to the first coil. An anode terminal of the second diode is electrically connected to the second coil.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A power conversion device 20 according to one embodiment will now be described.

Figure 1:
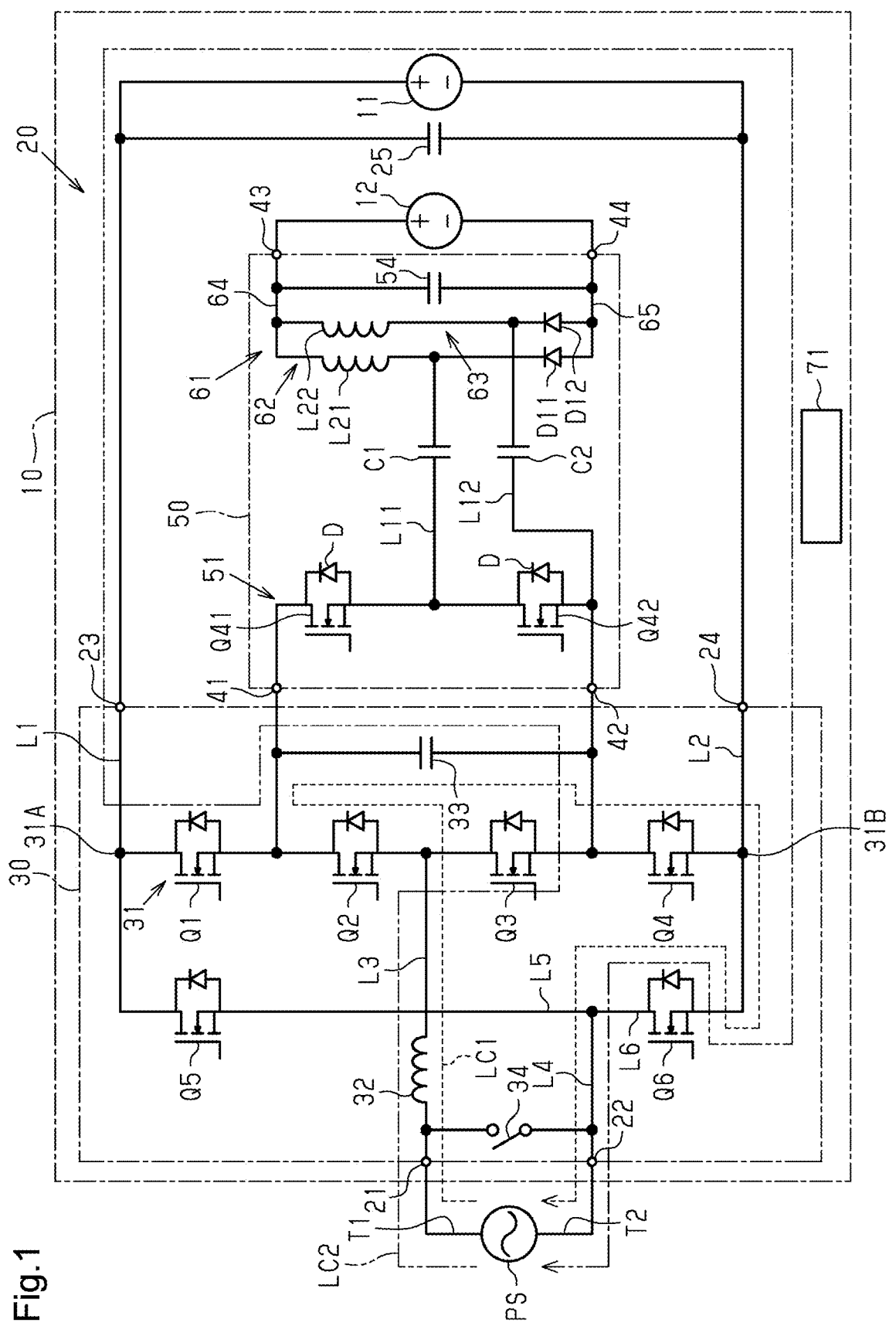
FIG. 1 is a circuit diagram of a power conversion device.

As shown in FIG. 1, a vehicle 10 includes a high-voltage battery 11, a low-voltage battery 12, and the power conversion device 20. The high-voltage battery 11 supplies power to, for example, the main drive system of the vehicle 10. The main drive system includes, for example, a traction motor that causes the vehicle 10 to travel. The low-voltage battery

12 supplies power to, for example, auxiliary devices of the vehicle 10. The auxiliary devices are electrical components other than the main drive system. The rated voltage of the high-voltage battery 11 is higher than the rated voltage of the low-voltage battery 12. Therefore, a higher voltage needs to be applied to charge the high-voltage battery 11 than to charge the low-voltage battery 12.

Power Conversion Device

The power conversion device 20 includes two input ends 21, 22, a first converter 30, two input-output ends 23, 24, and a capacitor 25. The two input ends 21, 22 are electrically connected to an external power supply PS. The external power supply PS is an AC power supply. The external power supply PS includes a first end T1 and a second end T2. The external power supply PS alternately switches the polarity between the first end T1 and the second end T2 with the passage of time. The first end T1 of the external power supply PS is electrically connected to a first input end 21, which is one of the two input ends 21, 22. The second end T2 of the external power supply PS is electrically connected to a second input end 22, which is the other one of the two input ends 21, 22. The power conversion device 20 charges the high-voltage battery 11 and the low-voltage battery 12 by converting power supplied from the external power supply PS, which is electrically connected to the input ends 21, 22.

The first converter 30 converts power input from the external power supply PS via the input ends 21, 22. The first converter 30 is a flying capacitor converter. The first converter 30 includes a switching circuit 31, a reactor 32, a flying capacitor 33, a switch 34, a first input-output line L1, and a second input-output line L2.

The switching circuit 31 includes a first switching element Q1, a second switching element Q2, a third switching element Q3, and a fourth switching element Q4. The switching circuit 31 is formed by connecting the first switching element Q1, the second switching element Q2, the third switching element Q3, and the fourth switching element Q4 in series in that order. The switching elements Q1 to Q4 are, for example, metal oxide semiconductor field effect transistors (MOSFETs). The switching elements Q1 to Q4 may be insulated gate bipolar transistors (IGBTs) or GaN-HEMTs.

The flying capacitor 33 electrically connects a connection point between the first switching element Q1 and the second switching element Q2 to a connection point between the third switching element Q3 and the fourth switching element Q4.

The switch 34 is provided between the first input end 21 and the second input end 22. The switch 34 is closed to connect the first input end 21 and the second input end 22 to each other.

The switching circuit 31 is electrically connected to the two input-output ends 23, 24. The first input-output line L1 electrically connects the input-output end 23, which is one of the two input-output ends 23, 24, to one end 31A of the switching circuit 31. The second input-output line L2 electrically connects the input-output end 24, which is the other one of the two input-output ends 23, 24, to another end 31B of the switching circuit 31. The first switching element Q1 is connected to the input-output end 23 via the first input-output line L1. The fourth switching element Q4 is connected to the input-output end 24 via the second input-output line L2.

The first converter 30 includes a fifth switching element Q5, a sixth switching element Q6, a first input line L3, a second input line L4, a positive electrode line L5, and a negative electrode line L6. The fifth switching element Q5 and the sixth switching element Q6 are connected to each other in series. The fifth switching element Q5 and the sixth switching element Q6 are, for example, MOSFETs. The fifth switching element Q5 and the sixth switching element Q6 may be IGBTs or GaN-HEMTs.

The first input line L3 electrically connects the first input end 21 to a connection point between the second switching element Q2 and the third switching element Q3. The reactor 32 is provided on the first input line L3.

The second input line L4 electrically connects the second input end 22 to one of the two input-output ends 23, 24. Whether the second input line L4 is electrically connected to the input-output end 23 or to the input-output end 24 is switched depending on whether the first end T1 is positive or the second end T2 is positive.

The positive electrode line L5 electrically connects the second input line L4 to the first input-output line L1. Thus, the second input line L4 is electrically connected to the input-output end 23 via the positive electrode line L5 and the first input-output line L1.

The negative electrode line L6 electrically connects the second input line L4 to the second input-output line L2. Thus, the second input line L4 is electrically connected to the input-output end 24 via the negative electrode line L6 and the second input-output line L2.

The fifth switching element Q5 is arranged on the positive electrode line L5. The sixth switching element Q6 is arranged on the negative electrode line L6. When the switching elements Q5, Q6 are MOSFETs, the switching elements Q5, Q6 are provided such that the forward direction of the parasitic diodes is a direction from the second input-output line L2 toward the first input-output line L1. Specifically, the anode terminal of the parasitic diode of the switching element Q6 is electrically connected to the second input-output line L2, and the cathode terminal of the parasitic diode of the switching element Q5 is electrically connected to the first input-output line L1.

The input-output end 23 is electrically connected to the positive electrode of the high-voltage battery 11. The input-output end 24 is electrically connected to the negative electrode of the high-voltage battery 11. In the first converter 30, AC power supplied from the external power supply PS is converted into DC power through switching operations of the first to fourth switching elements Q1 to Q4, and the DC power is output from the input-output ends 23, 24. The DC power output from the input-output ends 23, 24 is applied to the high-voltage battery 11. The high-voltage battery 11 is thus charged. The first converter 30 increases the voltage of AC power before outputting the DC power. The first converter 30 may decrease the voltage of AC power before outputting the DC power.

The capacitor 25 is provided between the first converter 30 and the high-voltage battery 11.

The power conversion device 20 includes two second converter input ends 41, 42, a second converter 50, and two output ends 43, 44.

The two second converter input ends 41, 42 are electrically connected to the opposite ends of the flying capacitor 33. The second converter input end 41 is electrically connected to one end of the flying capacitor 33, and the second converter input end 42 is electrically connected to the other end of the flying capacitor 33.

Figure 3:
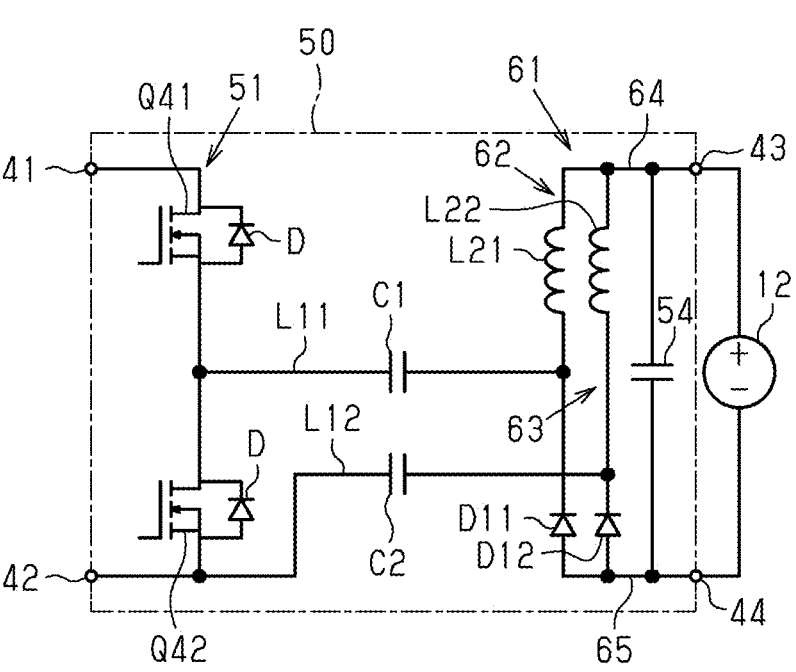
FIG. 3 is a circuit diagram of a second converter in the power conversion device shown in FIG. 1.

As shown in FIG. 3, the second converter 50 includes a primary-side circuit 51, a first connection line L11, a second connection line L12, a first capacitor C1, a second capacitor C2, a secondary-side circuit 61, and a capacitor 54.

The primary-side circuit 51 includes an upper arm switching element Q41 and a lower arm switching element Q42. The upper arm switching elements Q41 and the lower arm switching elements Q42, which are switching elements, each include a freewheeling diode D. The primary-side circuit 51 is a half-bridge circuit of the switching elements Q41, Q42. The upper arm switching element Q41 and the lower arm switching element Q42 are connected in series to each other. The upper arm switching element Q41 is electrically connected to the second converter input end 41. The lower arm switching element Q42 is electrically connected to the second converter input end 42. The switching elements Q41, Q42 are, for example, MOSFETs. The switching elements Q41, Q42 may be IGBTs or GaN-HEMTs.

The secondary-side circuit 61 includes a first leg 62, a second leg 63, a wire 64, and a wire 65. The first leg 62 includes a first coil L21 and a first diode D11, which are connected in series to each other. The second leg 63 includes a second coil L22 and a second diode D12, which are connected in series to each other. The secondary-side circuit 61 is electrically connected to the output ends 43, 44. The wire 64 connects the first coil L21 and the second coil L22 to the output end 43, which is one of the two output ends 43, 44. The wire 65 connects the first diode D11 and the second diode D12 to the output end 44, which is the other one of the two output ends 43, 44. The wire 64 is an example of a first wire. The wire 65 is an example of a second wire.

The anode terminal of the first diode D11 and the anode terminal of the second diode D12 are electrically connected to the negative output end of the output ends 43, 44. The cathode terminal of the first diode D11 is electrically connected to the first coil L21. The cathode terminal of the second diode D12 is electrically connected to the second coil L22. Thereby the cathode terminal of the first diode D11 and the cathode terminal of the second diode D12 are electrically connected to the positive output end of the output ends 43, 44. In one example, the anode terminal of the first diode D11 and the anode terminal of the second diode D12 are electrically connected to the output end 44. The cathode terminal of the first diode D11 and the cathode terminal of the second diode D12 are electrically connected to the output end 43.

The first connection line L11 and the second connection line L12 each include a first end and a second end. The first end of each of the first connection line L11 and the second connection line L12 is electrically connected to the primary-side circuit 51. The first end of the first connection line L11 is connected to a connection point between the upper arm switching element Q41 and the lower arm switching element Q42. The first end of the second connection line L12 is connected to the lower arm switching element Q42.

The second end of each of the first connection line L11 and the second connection line L12 is electrically connected to the secondary-side circuit 61. The second end of the first connection line L11 is connected to a connection point between the first coil L21 and the first diode D11. The second end of the second connection line L12 is connected to a connection point between the second coil L22 and the second diode D12. Thus, the primary-side circuit 51 and the secondary-side circuit 61 are electrically connected to each other by the first connection line L11 and the second connection line L12.

The first capacitor C1 is provided on the first connection line L11. The second capacitor C2 is provided on the second connection line L12. In the second converter 50, the primary-side circuit 51 and the secondary-side circuit 61 are insulated from each other by the first capacitor C1 and the second capacitor C2. The second converter 50 is an isolated DC/DC converter in which the primary-side circuit 51 and the secondary-side circuit 61 are electrically insulated from each other. The second converter 50 of the present embodiment is a capacitive isolation converter that insulates the primary-side circuit 51 and the secondary-side circuit 61 from each other using the first capacitor C1 and the second capacitor C2.

The output ends 43, 44 are electrically connected to the low-voltage battery 12. The output end 43 is connected to the positive electrode of the low-voltage battery 12. The output end 44 is connected to the negative electrode of the low-voltage battery 12. Thus, of the output ends 43, 44, the output end 43 is located at the positive side, and the output end 44 is located at the negative side.

The capacitor 54 is provided between the secondary-side circuit 61 and the low-voltage battery 12.

In the second converter 50, the voltage across the flying capacitor 33 is input to the primary-side circuit 51 as an input voltage. The primary-side circuit 51 converts power input via the two second converter input ends 41, 42 into AC power through switching operations of the switching elements Q41, Q42. Accordingly, the AC power is transmitted to the secondary-side circuit 61 via the first connection line L11 and the second connection line L12. The secondary-side circuit 61 converts the AC power input from the first connection line L11 and the second connection line L12 into DC power and outputs the DC power to the output ends 43, 44.

The power conversion device 20 includes a control unit 71. The control unit 71 includes a processor and a memory. The processor is, for example, a central processing unit (CPU), a graphics processing unit (GPU), or a digital signal processor (DSP). The storage unit includes a random-access memory (RAM) and a read-only memory (ROM). The storage unit stores program codes or instructions configured to cause the processor to execute processes. The storage unit, which is a computer-readable medium, includes any type of medium that is accessible by a general-purpose computer or a dedicated computer. The control unit 71 may include a hardware circuit such as an application specific integrated circuit (ASIC) and a field programmable gate array (FPGA). The control unit 71, which acts as processing circuitry, may include one or more processors that run on computer programs, one or more hardware circuits such as an ASIC and an FPGA, or a combination of such devices.

Control Performed by Control Unit

The control unit 71 controls the switching elements Q1 to Q6 to control the voltage of DC power output from the first converter 30 to the input-output ends 23, 24 and the voltage across the flying capacitor 33.

Charging With Power Supplied From External Power Supply

A case will be described in which at least one of the high-voltage battery 11 and the low-voltage battery 12 is charged with power supplied from the external power supply PS. When charging is performed with the power supplied from the external power supply PS, the switch 34 is opened.

When supplying power from the external power supply PS to the high-voltage battery 11 and the low-voltage battery 12, the control unit 71 alternately switches the switching patterns of the switching elements Q1 to Q4 between a first pattern and a second pattern. The first pattern is a switching pattern in which the first switching element Q1 is OFF, the second switching element Q2 is ON, the third switching element Q3 is OFF, and the fourth switching element Q4 is ON. The second pattern is a switching pattern in which the first switching element Q1 is ON, the second switching element Q2 is OFF, the third switching element Q3 is ON, and the fourth switching element Q4 is OFF.

When the first end T1 of the external power supply PS is positive, the control unit 71 turns OFF the fifth switching element Q5 and turns ON the sixth switching element Q6. In this case, current is allowed to flow from the sixth switching element Q6 to the second input line L4, while current is restricted from flowing from the second input line L4 to the fifth switching element Q5. Current flows from the sixth switching element Q6 to the second input line L4.

When the second end T2 of the external power supply PS is positive, the control unit 71 turns ON the fifth switching element Q5 and turns OFF the sixth switching element Q6. In this case, current is allowed to flow from the second input line L4 to the fifth switching element Q5, while current is restricted from flowing from the second input line L4 to the sixth switching element Q6. Current flows from the second input line L4 to the fifth switching element Q5.

As indicated by broken line LC1 in FIG. 1, when the first end T1 of the external power supply PS is positive and the switching pattern is the first pattern, current flows in the following order: from the first end T1 of the external power supply PS, through the reactor 32, the second switching element Q2, the flying capacitor 33, the fourth switching element Q4, and the sixth switching element Q6, and then to the second end T2 of the external power supply PS. The flying capacitor 33 is thus charged.

As indicated by long-dash double-short-dash line LC2 in FIG. 1, when the first end T1 of the external power supply PS is positive and the switching pattern is the second pattern, current flows in the following order: from the first end T1 of the external power supply PS, through the reactor 32, the third switching element Q3, the flying capacitor 33, the first switching element Q1, the high-voltage battery 11, and the sixth switching element Q6, and then to the second end T2 of the external power supply PS. Thus, the flying capacitor 33 is charged.

Figure 2:
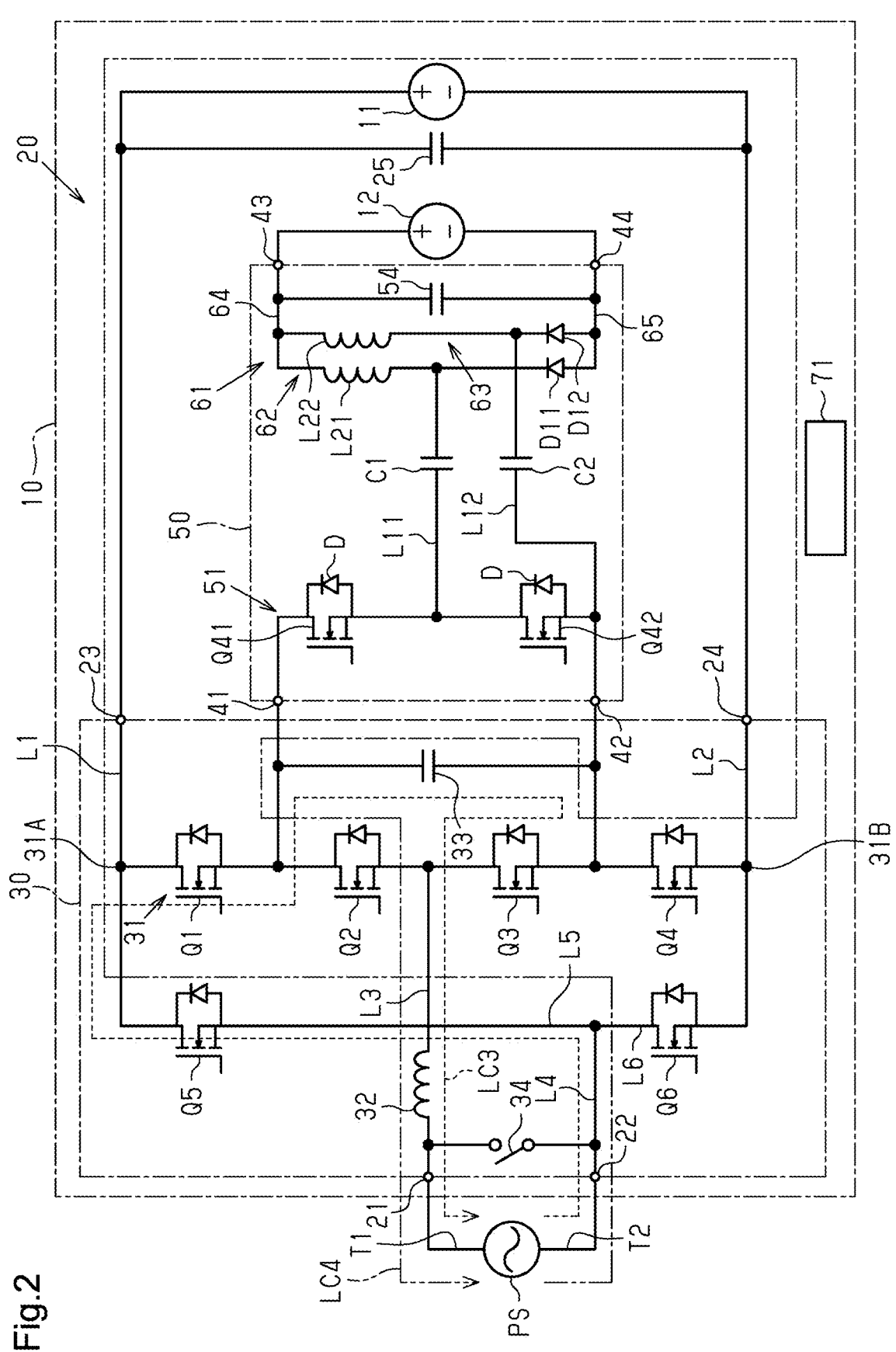
FIG. 2 is a circuit diagram of the power conversion device.

As indicated by broken line LC3 in FIG. 2, when the second end T2 of the external power supply PS is positive and the switching pattern is the second pattern, current flows in the following order: from the second end T2 of the external power supply PS, through the fifth switching element Q5, the first switching element Q1, the flying capacitor 33, and the third switching element Q3, the reactor 32, and then to the first end T1 of the external power supply PS. The flying capacitor 33 is thus charged.

As indicated by long-dash double-short-dash line LC4 in FIG. 2, when the second end T2 of the external power supply PS is positive and the switching pattern is the first pattern, current flows in the following order: from the second end T2 of the external power supply PS, through the fifth switching element Q5, the high-voltage battery 11, the fourth switching element Q4, the flying capacitor 33, and the second switching element Q2, the reactor 32, and then to the first end T1 of the external power supply PS. The flying capacitor 33 is thus charged.

The control unit 71 controls the switching elements Q1 to Q6 such that output voltage from the input-output ends 23, 24 follows a target value and the voltage across the flying capacitor 33 follows a target value. This allows the control unit 71 to charge the high-voltage battery 11 by controlling output voltage from the input-output ends 23, 24. The control unit 71 is capable of controlling the voltage across the flying capacitor 33.

The control unit 71 controls the switching elements Q41, Q42 to control the voltage of DC power output from the second converter 50 to the output ends 43, 44. For example, the control unit 71 alternately switches the switching patterns of the switching elements Q41, Q42 between a third pattern and a fourth pattern. The third pattern is a switching pattern in which the upper arm switching element Q41 is ON and the lower arm switching element Q42 is OFF. The fourth pattern is a switching pattern in which the upper arm switching element Q41 is OFF and the lower arm switching element Q42 is ON.

The control unit 71 controls the switching elements Q41, Q42 such that output voltage from the output ends 43, 44 follows a target value. This allows the control unit 71 to charge the low-voltage battery 12 by controlling the output voltage from the input-output ends 43, 44.

When supplying power from the external power supply PS to the high-voltage battery 11 without supplying power to the low-voltage battery 12, the control unit 71 alternately switches the switching patterns of the switching elements Q1 to Q4 between a fifth pattern and a sixth pattern. The fifth pattern is a switching pattern in which the first switching element Q1 is OFF, the second switching element Q2 is OFF, the third switching element Q3 is ON, and the fourth switching element Q4 is ON. The sixth pattern is a switching pattern in which the first switching element Q1 is ON, the second switching element Q2 is ON, the third switching element Q3 is OFF, and the fourth switching element Q4 is OFF.

When the first end T1 of the external power supply PS is positive, the control unit 71 turns OFF the fifth switching element Q5 and turns ON the sixth switching element Q6. In this case, current is allowed to flow from the second input-output line L2 to the sixth switching element Q6, while current is restricted from flowing from the first input-output line L1 to the fifth switching element Q5. Current flows from the sixth switching element Q6 to the second input line L4.

When the second end T2 of the external power supply PS is positive, the control unit 71 turns ON the fifth switching element Q5 and turns OFF the sixth switching element Q6. In this case, current is allowed to flow from the second input line L4 to the fifth switching element Q5, while current is restricted from flowing from the second input line L4 to the sixth switching element Q6. Current flows from the second input line L4 to the fifth switching element Q5.

When the first end T1 of the external power supply PS is positive and the switching pattern is the fifth pattern, current flows in the following order: from the first end T1 of the external power supply PS, through the reactor 32, the third switching element Q3, the fourth switching element Q4, and the sixth switching element Q6, and then to the second end T2 of the external power supply PS.

When the first end T1 of the external power supply PS is positive and the switching pattern is the sixth pattern, current flows in the following order: from the first end T1 of the external power supply PS, the reactor 32, the second switching element Q2, the first switching element Q1, the high-voltage battery 11, and the sixth switching element Q6, and then to the second end T2 of the external power supply PS.

When the second end T2 of the external power supply PS is positive and the switching pattern is the fifth pattern, current flows in the following order: from the second end T2 of the external power supply PS, the fifth switching element Q5, the first switching element Q1, the second switching element Q2, and the reactor 32, and then to the first end T1 of the external power supply PS.

When the second end T2 of the external power supply PS is positive and the switching pattern is the fifth pattern, current flows in the following order: from the second end T2 of the external power supply PS, through the fifth switching element Q5, the high-voltage battery 11, the fourth switching element Q4, the third switching element Q3, and the reactor 32, and then to the first end T1 of the external power supply PS.

The control unit 71 controls the switching elements Q1 to Q6 such that the output voltage from the input-output ends 23, 24 follows a target value. This allows the control unit 71 to charge the high-voltage battery 11 by controlling output voltage from the input-output ends 23, 24.

Charge of Low-Voltage Battery With Power Supplied From High-Voltage Battery

A case will now be described in which the low-voltage battery 12 is charged by supplying power from the high-voltage battery 11 to the low-voltage battery 12. When charging the low-voltage battery 12 with the high-voltage battery 11, the switch 34 is closed.

The control unit 71 maintains the first switching element Q1 and the third switching element Q3 in an OFF state. The control unit 71 maintains the second switching element Q2 and the fourth switching element Q4 in an ON state. In this state, the fifth switching element Q5 and the sixth switching element Q6 are operated in a chopper mode to decrease the voltage supplied from the high-voltage battery 11 through the input-output ends 23, 24. By alternately turning ON the fifth switching element Q5 and the sixth switching element Q6, the voltage supplied from the high-voltage battery 11 is decreased before being output. As a result, the voltage across the flying capacitor 33 is controlled. In the present embodiment, the switching elements Q1 to Q6 are conversion switching elements. The switching elements Q1 to Q6 form a step-down circuit, and the voltage across the flying capacitor 33 is controlled by the voltage output from the step-down circuit.

The control unit 71 alternately turns ON the upper arm switching element Q41 and the lower arm switching element Q42. This alternating operation induces series resonance, which controls the output voltage of the second converter 50. As a result, the low-voltage battery 12 is charged. Operation of the second converter 50 of the present embodiment will now be described.

Figure 4:
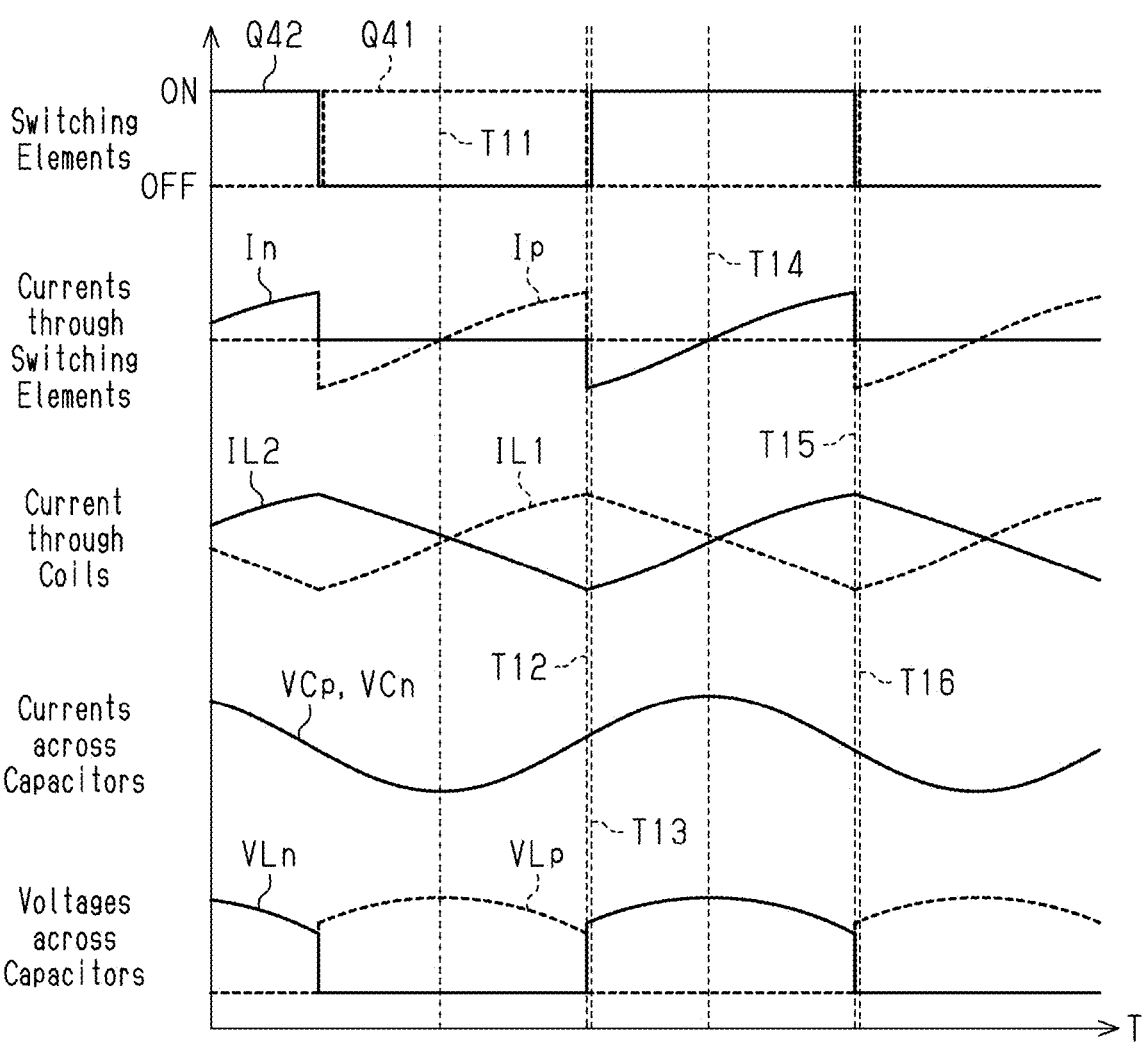
FIG. 4 is a timing diagram showing the relationship among the states of a fifth switching element and a sixth switching element, currents flowing through the fifth switching element and the sixth switching element, currents flowing through a first coil and a second coil, voltages across a first capacitor and a second capacitor, and voltages across the first coil and the second coil.

FIG. 4 shows ON and OFF of the upper arm switching element Q41 and the lower arm switching element Q42, a current Ip flowing through the upper arm switching element Q41, a current In flowing through the lower arm switching element Q42, a current IL1 flowing through the first coil L21, a current IL2 flowing through the second coil L22, a voltage VCp across the first capacitor C1, a voltage VCn across the second capacitor C2, a voltage VLp across the first coil L21, and a voltage VLn across the second coil L22.

FIGS. 5 to 10 show a load current I1 and a no-load current I2. The load current I1 is a current flowing through the low-voltage battery 12, which is a load. The no-load current I2 does not flow through the low-voltage battery 12, which is a load.

Figure 5:
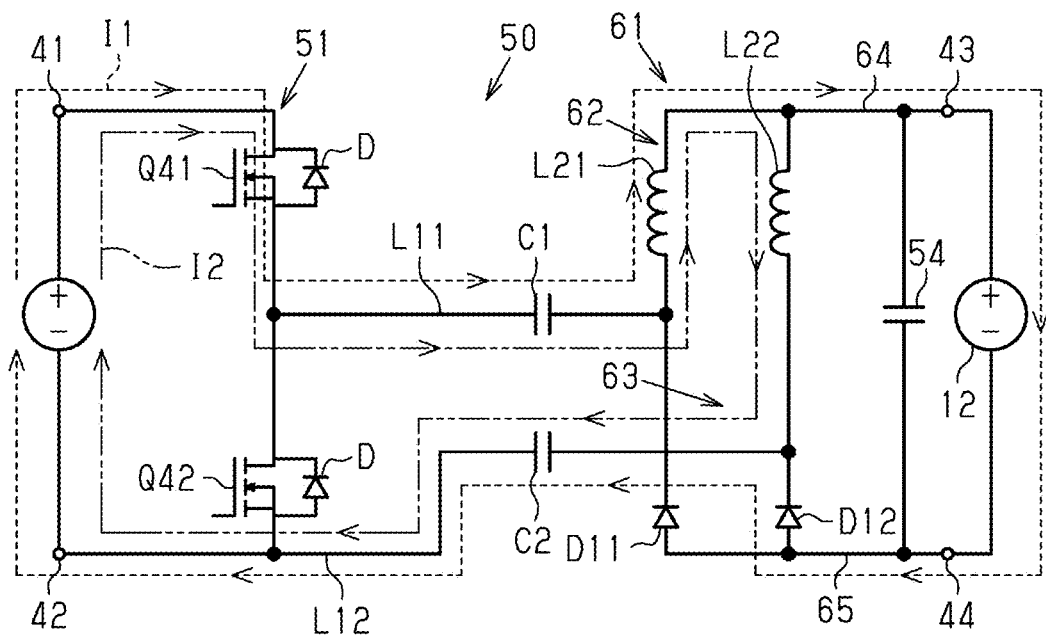
FIG. 5 is a diagram showing a load current and a no-load current flowing through the second converter shown in FIG. 4.

As shown in FIG. 4, the upper arm switching element Q41 is ON and the lower arm switching element Q42 is OFF at point in time T11. As shown in FIG. 5, at point in time T11, the voltage across the flying capacitor 33, which is a DC power supply, is input to the second converter 50 by turning ON the upper arm switching element Q41. The load current I1 flows along a path through the upper arm switching element Q41, the first capacitor C1, the first coil L21, the low-voltage battery 12, the second diode D12, and the second capacitor C2. The no-load current I2 flows along a path through the upper arm switching element Q41, the first capacitor C1, the first coil L21, the second coil L22, and the second capacitor C2. Accordingly, the first capacitor C1 and the second capacitor C2 are charged.

Figure 6:
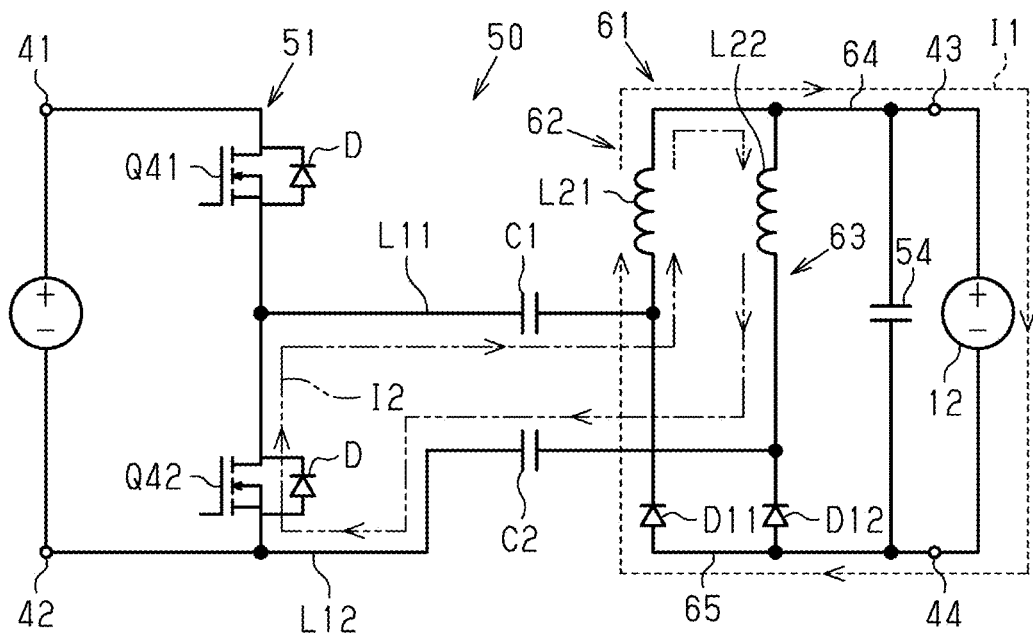
FIG. 6 is a diagram showing a load current and a no-load current flowing through the second converter shown in FIG. 4.

At point in time T12, the upper arm switching element Q41 is turned OFF. As a result, the flying capacitor 33 stops supplying power to the second converter 50. The energy stored in the first coil L21 causes the load current I1 to flow. As shown in FIG. 6, the load current I1 flows along a path through the first coil L21, the low-voltage battery 12, and the first diode D11. The energy stored in the second coil L22 causes the no-load current I2 to flow. The no-load current I2 flows along a path through the second coil L22, the second capacitor C2, the freewheeling diode D of the lower arm switching element Q42, the first capacitor C1, and the first coil L21. The no-load current I2 causes the lower arm switching element Q42 to enter a reverse conduction state.

Figure 7:
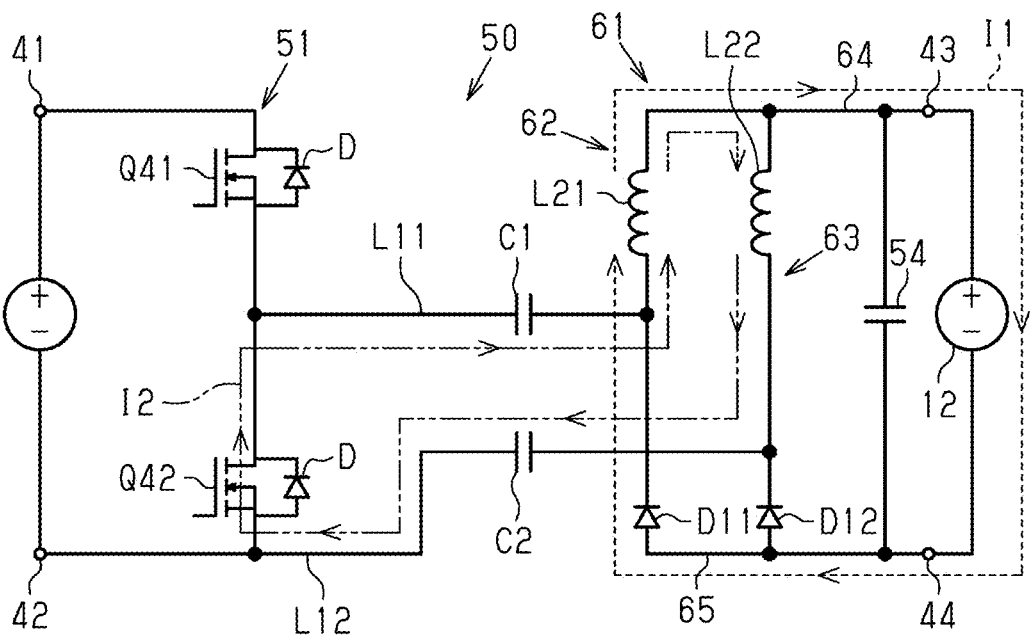
FIG. 7 is a diagram showing a load current and a no-load current flowing through the second converter shown in FIG. 4.

At point in time T13, the lower arm switching element Q42 is turned ON with the lower arm switching element Q42 in a reverse conduction state. Since the lower arm switching element Q42 is in a reverse conduction state, the voltage across the lower arm switching element Q42 is 0. This allows zero voltage switching (ZVS) to be performed. As shown in FIG. 7, the path through which the load current I1 flows is the same as that at point in time T12. The no-load current I2 flows along a path through the second coil L22, the second capacitor C2, the lower arm switching element Q42, the first capacitor C1, and the first coil L21.

Figure 8:
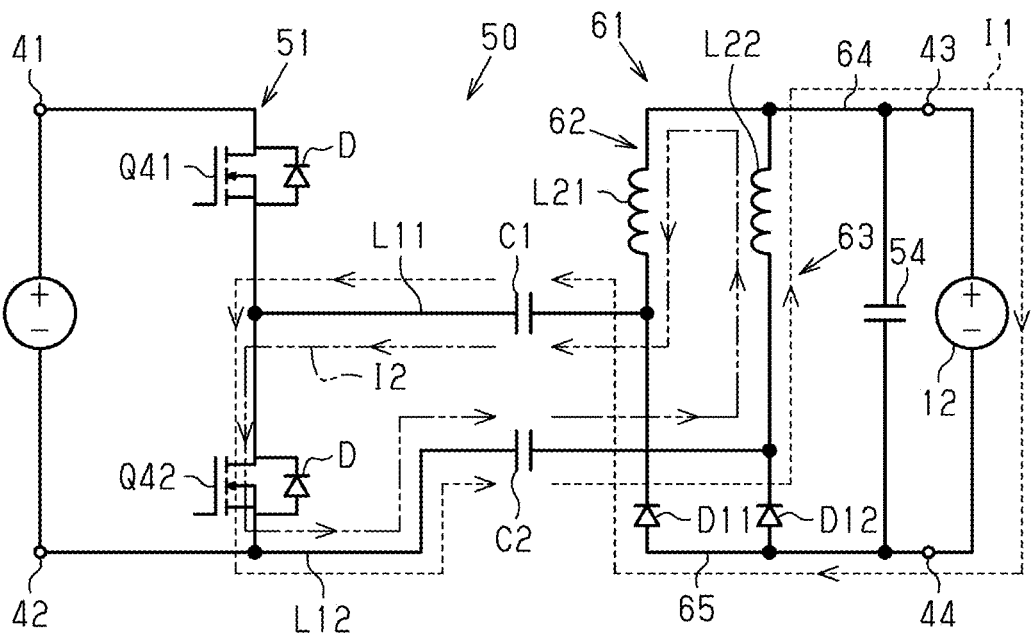
FIG. 8 is a diagram showing a load current and a no-load current flowing through the second converter shown in FIG. 4.

As time elapses from point in time T13, the output current from the first coil L21 and the second coil L22 decreases. At point in time T14, the operation switches to discharging from the first capacitor C1 and the second capacitor C2. This changes the current polarity of the no-load current I2. As shown in FIG. 8, the load current I1 flows along a path through the first capacitor C1, the lower arm switching elements Q42, the second capacitor C2, the second coil L22, the low-voltage battery 12, and the first diode D11. The voltage of the first capacitor C1 and the voltage of the second capacitor C2 decrease due to discharge. At the same time, energy progressively accumulates in the first coil L21 and the second coil L22.

Figure 9:
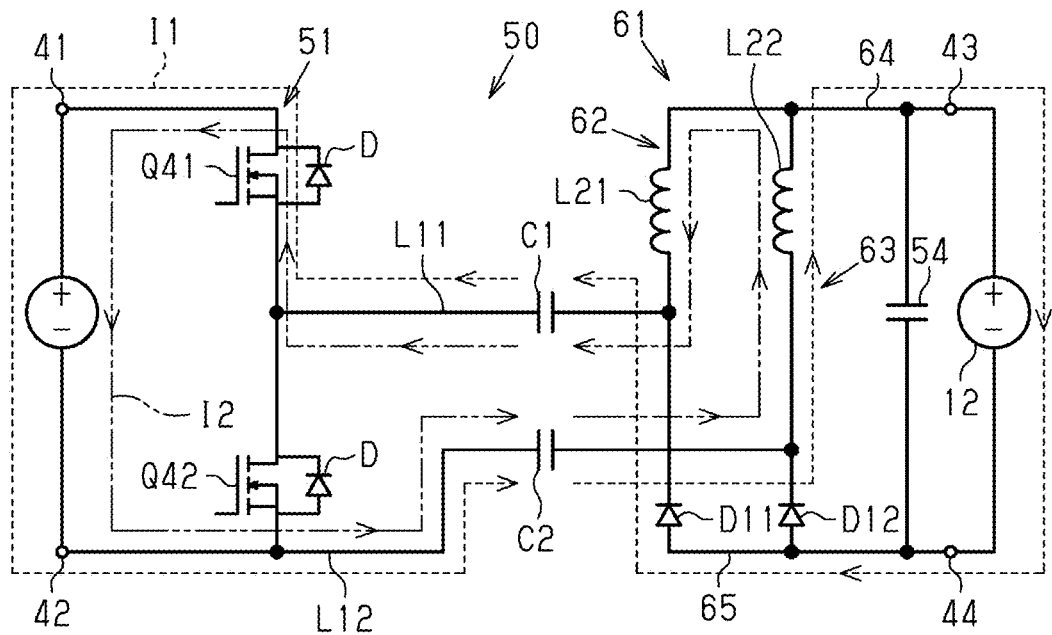
FIG. 9 is a diagram showing a load current and a no-load current flowing through the second converter shown in FIG. 4.

At point in time T15, the lower arm switching element Q42 is turned OFF. As shown in FIG. 9, the load current I1 flows along a path through the first capacitor C1, the freewheeling diode D of the upper arm switching elements Q41, the second capacitor C2, the second coil L22, the low-voltage battery 12, and the first diode D11. The no-load current I2 flows along a path through the second capacitor C2, the second coil L22, the first coil L21, the first capacitor C1, and the freewheeling diode D of the upper arm switching element Q41. The load current I1 and the no-load current I2 cause the upper arm switching element Q41 to enter a reverse conduction state.

Figure 10:
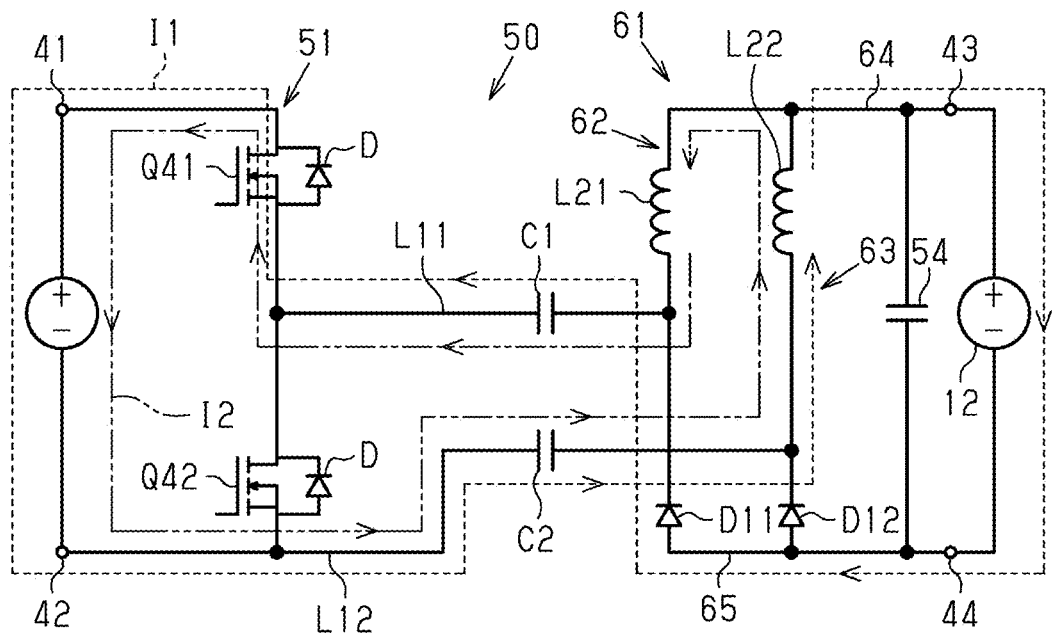
FIG. 10 is a diagram showing a load current and a no-load current flowing through the second converter shown in FIG. 4.

At point in time T16, the upper arm switching element Q41 is turned ON. Since the upper arm switching element Q41 is in a reverse conduction state, the voltage across the upper arm switching element Q41 is 0. This allows ZVS to be performed. As shown in FIG. 10, the paths of the load current I1 and the no-load current I2 are changed to paths through the freewheeling diode D of the upper arm switching element Q41 and the upper arm switching element Q41.

Operation of Present Embodiment

The power conversion device 20 includes the switch 34. The voltage of the high-voltage battery 11 can be decreased and input to the second converter 50 by closing the switch 34 and controlling the first to sixth switching elements Q1 to Q6. The second converter 50 decreases the input voltage before outputting the voltage. The low-voltage battery 12 is thus charged.

The second converter 50 of the present embodiment is a capacitive isolation converter that insulates the primary-side circuit 51 and the secondary-side circuit 61 from each other using the first capacitor C1 and the second capacitor C2. Since a capacitive isolation converter does not include a transformer, the input voltage is unlikely to be decreased. Particularly, under light load conditions, it is difficult to decrease the input voltage, and when a half-bridge circuit is used as the primary-side circuit 51 as in the present embodiment, there are cases in which the input voltage can only be decreased to half. Thus, the voltage across the flying capacitor 33 may have to be decreased in accordance with the output voltage of the second converter 50. For example, when the target value of the output voltage of the second converter 50 is 15 V and the second converter 50 can only decrease the input voltage to half, the voltage across the flying capacitor 33, which serves as the input voltage of the second converter 50, needs to be 30 V. The lower the voltage across the flying capacitor 33, the greater the current becomes. The current from the high-voltage battery 11 is supplied through the second switching element Q2, the fourth switching element Q4, the fifth switching element Q5, and the sixth switching element Q6. The lower the voltage across the flying capacitor 33, the greater the current flowing through the switching elements Q2, Q4, Q5, Q6 becomes. As a result, the required current rating for the switching elements Q2, Q4, Q5, and Q6 may need to be increased.

In the present embodiment, the secondary-side circuit 61 includes the leg 62, which connects the first coil L21 and the first diode D11 in series, and the leg 63, which connects the second coil L22 and the second diode D12 in series. In the secondary-side circuit 61, output currents are generated in the coils L21, L22 of the legs 62, 63. The sum of the output currents of the two coils L21, L22 is the entire output current, so that the current input to the secondary-side circuit 61 is increased. As a result, the voltage can be decreased using the secondary-side circuit 61, allowing the voltage of the flying capacitor 33 to be increased accordingly.

Advantages of Present Embodiment (1) The secondary-side circuit 61 includes the leg 62, which connects the first coil L21 and the first diode D11 in series, and the leg 63, which connects the second coil L22 and the second diode D12 in series. Output currents are generated in the coils L21, L22 of the legs 62, 63. The sum of the output currents of the two coils L21, L22 is the entire output current, so that the current input to the secondary-side circuit 61 is increased. As the output current increases, the output voltage of the second converter 50 decreases. This decreases the output voltage from the output ends 43, 44.

(2) The second converter 50 performs power conversion using the voltage across the flying capacitor 33 as an input voltage. The voltage across the flying capacitor 33 is controlled by decreasing the voltage of the high-voltage battery 11 through switching operations of the switching elements Q2, Q4, Q5, Q6. The lower the voltage across the flying capacitor 33, the greater the current flowing through the switching elements Q2, Q4, Q5, Q6 becomes. This may increase the current rating required for the switching elements Q2, Q4, Q5, Q6. As in the present embodiment, the output voltage of the secondary-side circuit 61 is decreased by increasing the output current of the secondary-side circuit 61. As a result, the step-down ratio of the second converter 50 is increased. Even when the voltage across the flying capacitor 33 is increased, it is possible to output the output voltage required for the second converter 50. Consequently, this configuration suppresses the increase in current through the switching elements Q2, Q4, Q5, Q6 that would otherwise be caused by decreasing the voltage across the flying capacitor 33.

(3) The power conversion device 20 is mounted on the vehicle 10. The vehicle 10 includes the high-voltage battery 11, which is required to drive the main drive system, and the low-voltage battery 12, which is required to drive the auxiliary devices. There may be situations in which it is necessary to charge the low-voltage battery 12 using the high-voltage battery 11, such as when power supply from the external power supply PS is unavailable. If the voltage of the high-voltage battery 11 is higher than that of the external power supply PS, the current flowing through the switching elements Q2, Q4, Q5, Q6 increases. As a result, it may become impossible to charge the low-voltage battery 12 using the high-voltage battery 11. For example, if the current rating of the switching elements Q2, Q4, Q5, Q6 only meets the requirements for current flowing during charging by the external power supply PS, it will not be possible to use the high-voltage battery 11 to charge the low-voltage battery 12. However, as in the present embodiment, reducing the current flowing through the switching elements Q2, Q4, Q5, Q6 allows the high-voltage battery 11 to be used to charge the low-voltage battery 12. This configuration enables the circuit to be shared for both charging the low-voltage battery 12 using the external power source PS and charging the low-voltage battery 12 using the high-voltage battery 11.

Modifications

The above-described embodiment may be modified as follows. The above-described embodiment and the following modifications can be combined as long as the combined modifications remain technically consistent with each other.

The primary-side circuit 51 of the second converter 50 may be modified as long as it converts the input power into AC power. For example, the primary-side circuit 51 may have a configuration shown in FIG. 11. The primary-side circuit 51 includes a first upper arm switching element Q11, a first lower arm switching element Q12, a second upper arm switching element Q13, and a second lower arm switching element Q14. The primary-side circuit 51 is a full-bridge circuit of the switching elements Q11 to Q14. The first upper arm switching element Q11 and the first lower arm switching element Q12 are connected in series to each other. The second upper arm switching element Q13 and the second lower arm switching element Q14 are connected in series to each other. The upper arm switching elements Q11, Q13 are electrically connected to the second converter input end 41. The lower arm switching elements Q12, Q14 are electrically connected to the second converter input end 42. The switching elements Q11 to Q14 are, for example, MOSFETs. The switching elements Q11 to Q14 may be IGBTs or GaN-HEMTs.

Figure 11:
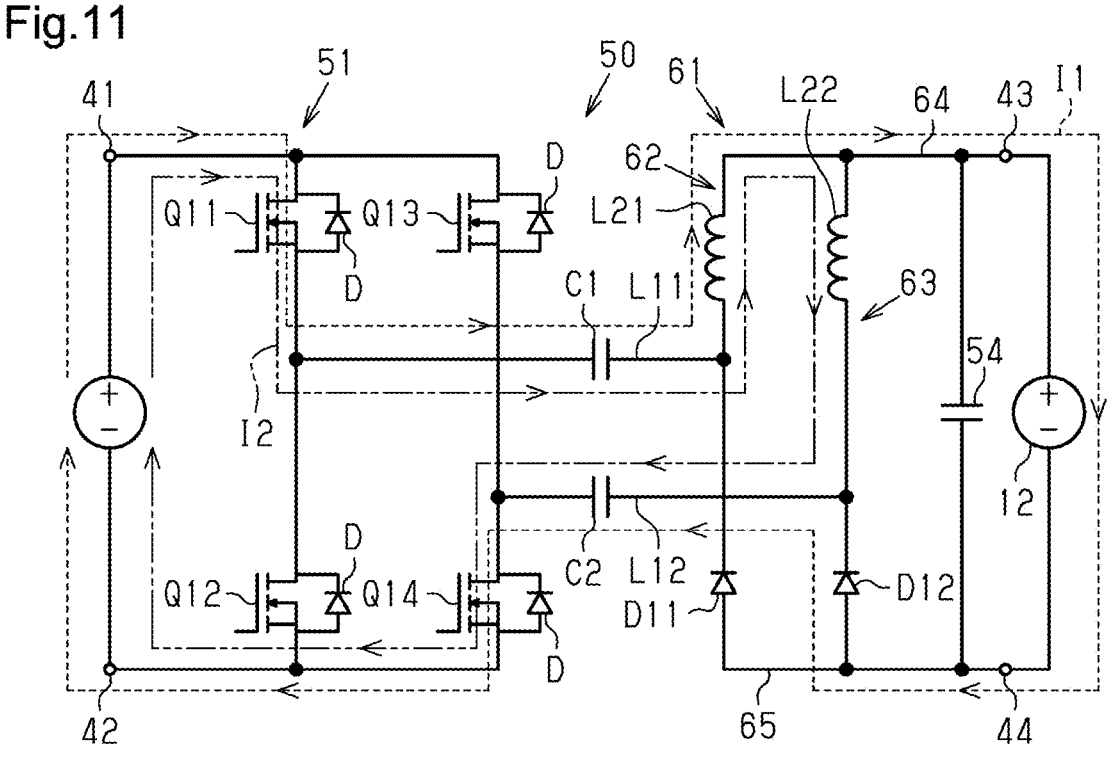
FIG. 11 is a diagram showing a load current and a no-load current in a second converter according to a modification.

When the primary-side circuit 51 has a configuration shown in FIG. 11, the switching patterns of the switching elements Q11 to Q14 are alternately switched between a seventh pattern and an eighth pattern. The seventh pattern is a switching pattern in which the first upper arm switching element Q11 is ON, the first lower arm switching element Q12 is OFF, the second upper arm switching element Q13 is OFF, and the second lower arm switching element Q14 is ON. The eighth pattern is a switching pattern in which the first upper arm switching element Q11 is OFF, the first lower arm switching element Q12 is ON, the second upper arm switching element Q13 is ON, and the second lower arm switching element Q14 is OFF.

The first connection line L11 connects a connection point between the first upper arm switching element Q11 and the first lower arm switching element Q12 to a connection point between the first coil L21 and the first diode D11. The second connection line L12 connects a connection point between the second upper arm switching element Q13 and the second lower arm switching element Q14 to a connection point between the second coil L22 and the second diode D12.

The switching pattern transition of the primary-side circuit 51 will be described below.

As shown in FIG. 11, when the switching pattern of the primary-side circuit 51 is the seventh pattern, the load current I1 flows along a path through the first upper arm switching element Q11, the first capacitor C1, the first coil L21, the low-voltage battery 12, the second diode D12, the second capacitor C2, and the second lower arm switching element Q14. The no-load current I2 flows along a path through the first upper arm switching element Q11, the first capacitor C1, the first coil L21, the second coil L22, the second capacitor C2, and the second lower arm switching element Q14. Accordingly, the first capacitor C1 and the second capacitor C2 are charged.

Figure 12:
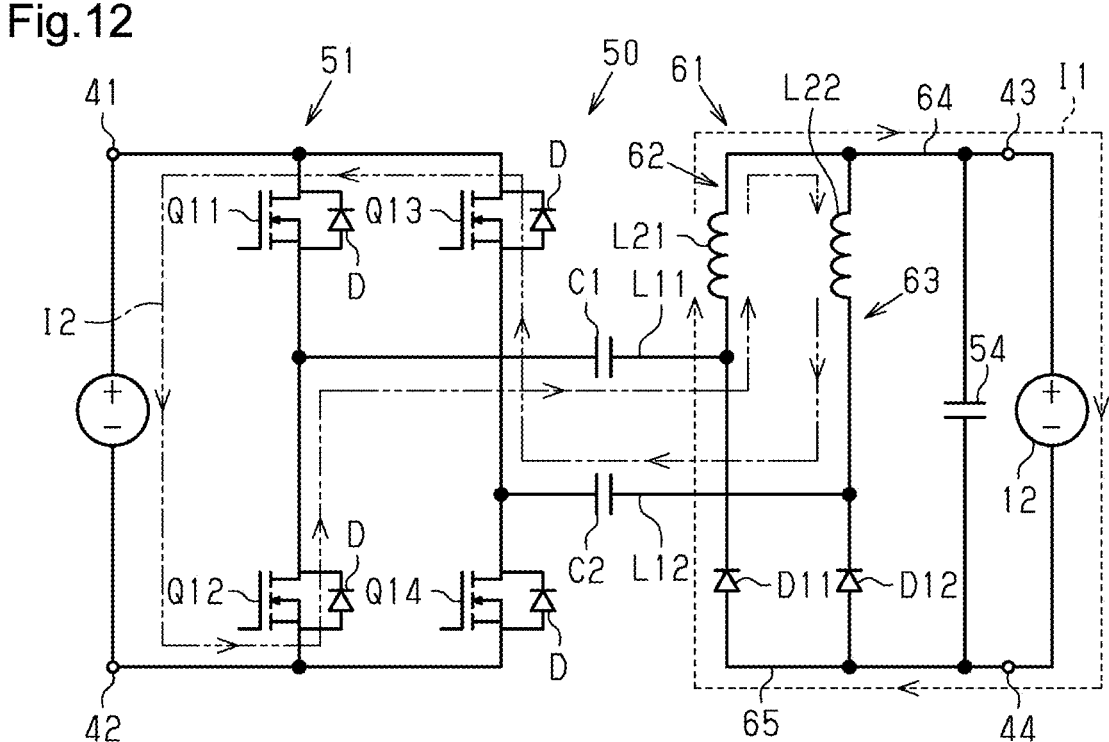
FIG. 12 is a diagram showing a load current and a no-load current in a second converter according to the modification.

As shown in FIG. 12, when the first upper arm switching element Q11 and the second lower arm switching element Q14 are turned OFF, the energy stored in the first coil L21 causes the load current I1 to flow. The load current I1 flows along a path through the first coil L21, the low-voltage battery 12, and the first diode D11. The energy stored in the second coil L22 causes the no-load current I2 to flow. The no-load current I2 flows along a path through the second coil L22, the second capacitor C2, the freewheeling diode D of the second upper arm switching element Q13, the freewheeling diode D of the first lower arm switching element Q12, the first capacitor C1, and the first coil L21. The no-load current I2 causes the first lower arm switching element Q12 and the second upper arm switching element Q13 to enter a reverse conduction state.

Figure 13:
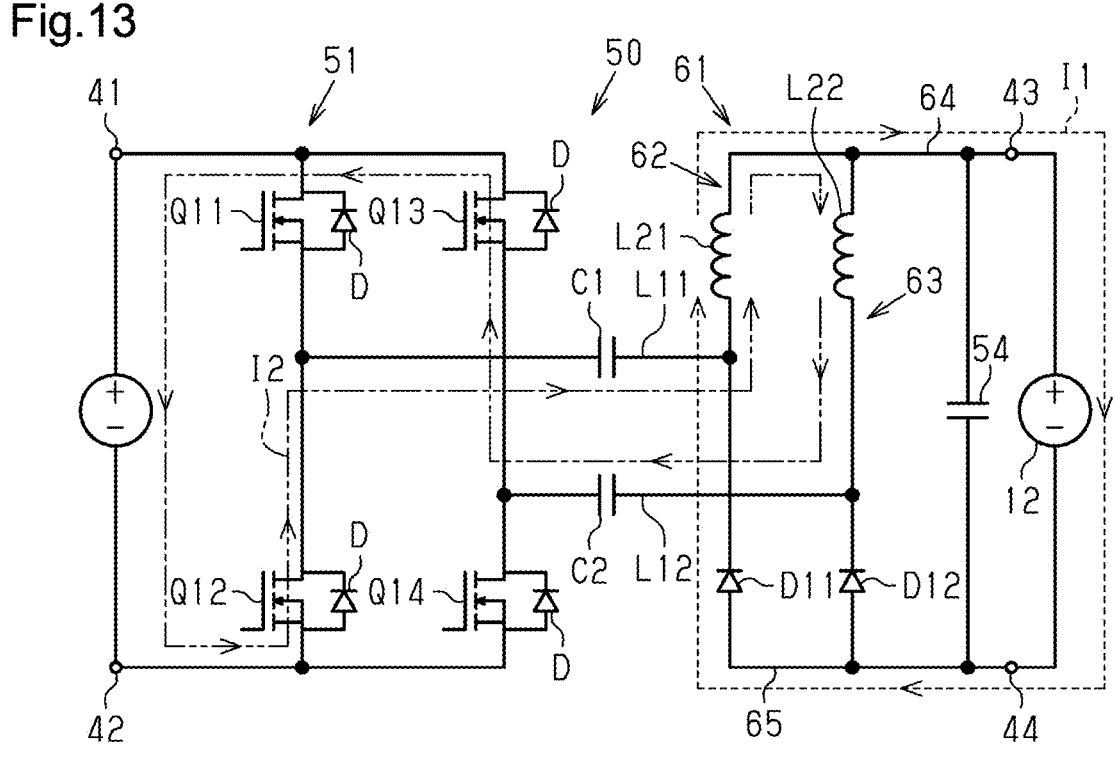
FIG. 13 is a diagram showing a load current and a no-load current in a second converter according to the modification.

As shown in FIG. 13, the control unit 71 sets the switching pattern of the primary-side circuit 51 to the eighth pattern. The first lower arm switching element Q12 and the second upper arm switching element Q13 are turned ON with the first lower arm switching element Q12 and the second upper arm switching element Q13 in a reverse conduction state. Since the first lower arm switching element Q12 and the second upper arm switching element Q13 are in a reverse conduction state, the voltage across each of the switching elements Q12, Q13 is 0. This allows ZVS to be performed. The load current I1 flows along a path through the first coil L21, the low-voltage battery 12, and the first diode D11. The no-load current I2 flows along a path through the second coil L22, the second capacitor C2, the second upper arm switching element Q13, the first lower arm switching element Q12, the first capacitor C1, and the first coil L21.

Figure 14:
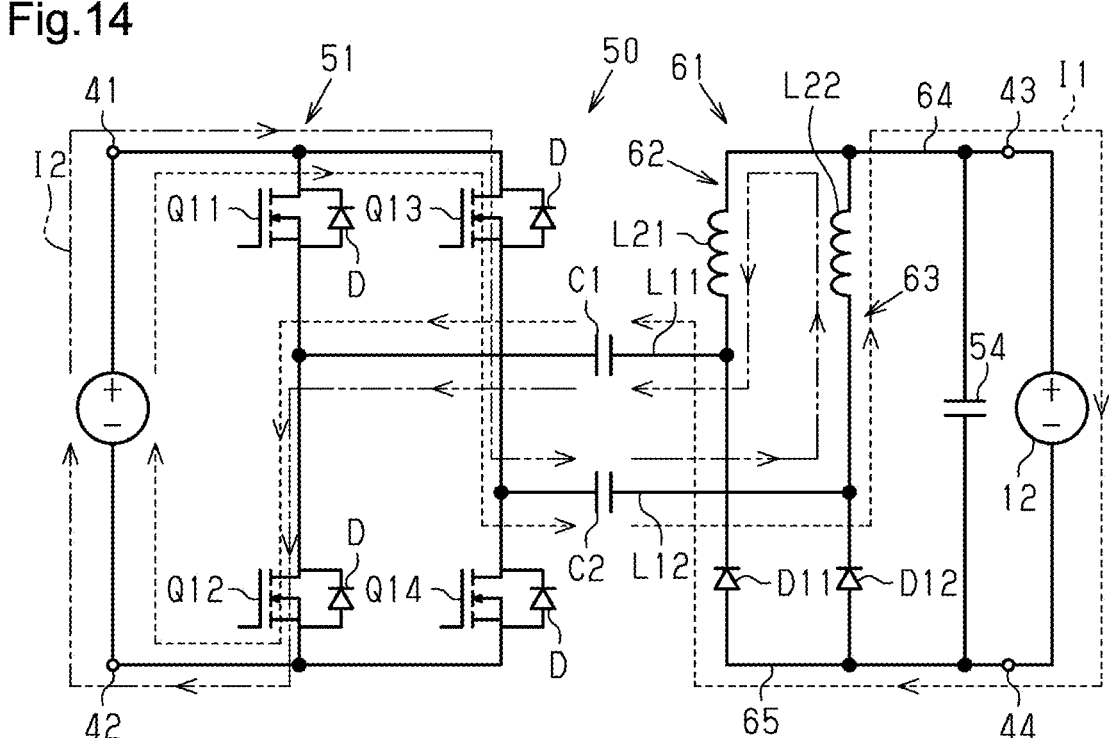
FIG. 14 is a diagram showing a load current and a no-load current in a second converter according to the modification.

As shown in FIG. 14, when the output current from the first coil L21 and the second coil L22 decreases, and the first capacitor C1 and the second capacitor C2 are switched to discharge, the current polarity of the no-load current I2 changes. The load current I1 flows along a path through the first capacitor C1, the first lower arm switching element Q12, the second upper arm switching element Q13, the second capacitor C2, the second coil L22, the low-voltage battery 12, and the first diode D11. The voltage of the first capacitor C1 and the voltage of the second capacitor C2 decrease due to discharge. At the same time, energy progressively accumulates in the first coil L21 and the second coil L22.

Figure 15:
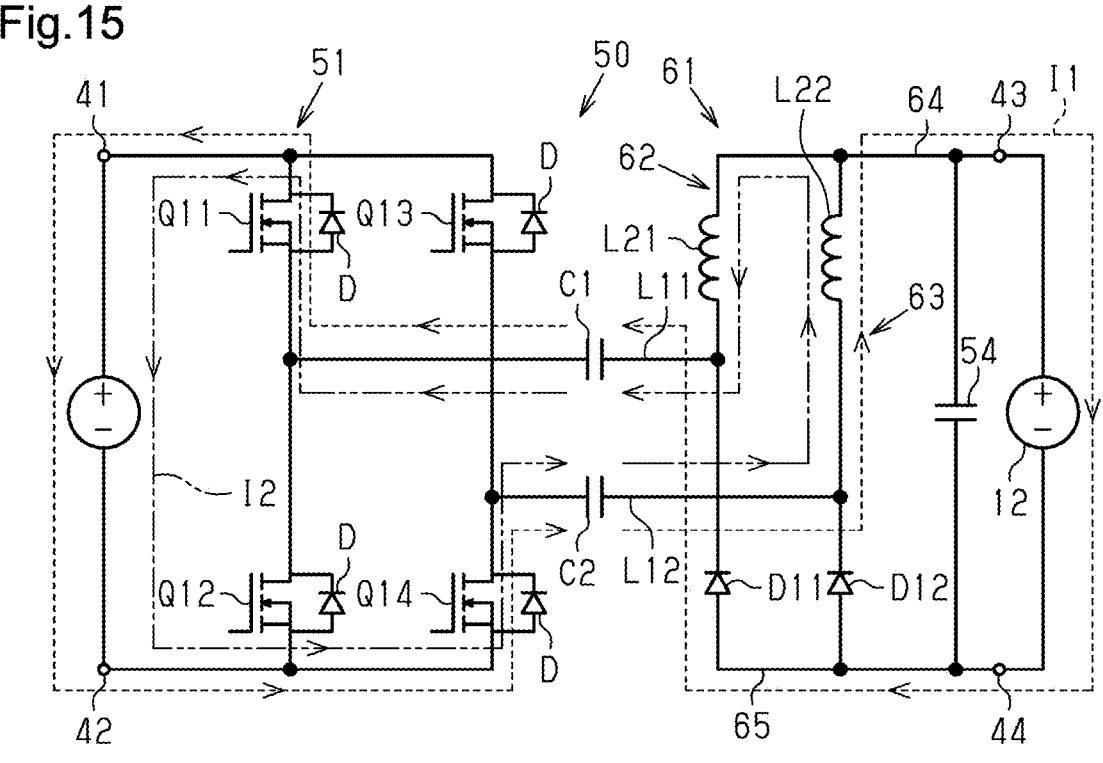
FIG. 15 is a diagram showing a load current and a no-load current in a second converter according to the modification.

As shown in FIG. 15, the first lower arm switching element Q12 and the second upper arm switching element Q13 are turned OFF. The load current I1 flows along a path through the first capacitor C1, the freewheeling diode D of the first upper arm switching element Q11, the freewheeling diode D of the second lower arm switching element Q14, the second capacitor C2, the second coil L22, the low-voltage battery 12, and the first diode D11. The no-load current I2 flows along a path through the second capacitor C2, the second coil L22, the first coil L21, the first capacitor C1, the freewheeling diode D of the first upper arm switching element Q11, and the freewheeling diode D of the second lower arm switching element Q14. The load current I1 and the no-load current I2 cause the first upper arm switching element Q11 and the second lower arm switching element Q14 to enter a reverse conduction state.

Figure 16:
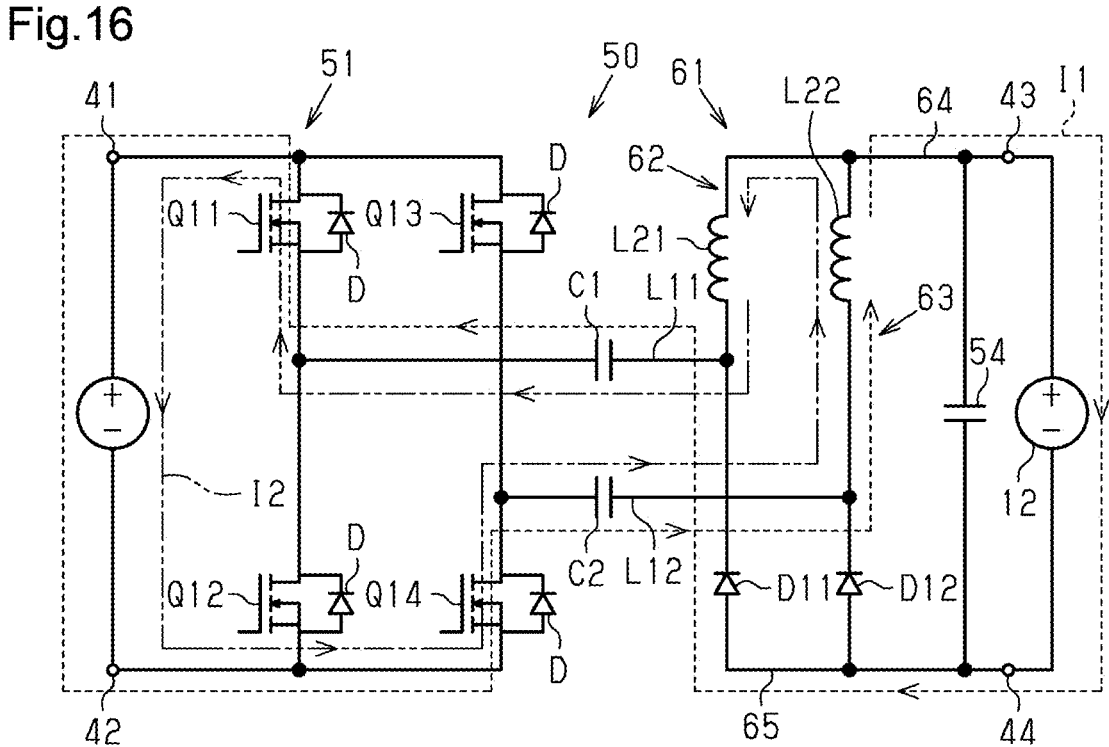
FIG. 16 is a diagram showing a load current and a no-load current in a second converter according to the modification.

As shown in FIG. 16, the control unit 71 sets the switching pattern of the primary-side circuit 51 to the seventh pattern. The first upper arm switching element Q11 and the second lower arm switching element Q14 are turned ON with the first upper arm switching element Q11 and the second lower arm switching element Q14 in a reverse conduction state. Since the first upper arm switching element Q11 and the second lower arm switching element Q14 are in a reverse conduction state, the voltage across each of the switching elements Q11, Q14 is 0. This allows ZVS to be performed. The paths of the load current I1 and the no-load current I2 change from the paths through the freewheeling diode D of the first upper arm switching element Q11 and the freewheeling diode D of the second lower arm switching element Q14 to the paths through the first upper arm switching element Q11 and the second lower arm switching element Q14.

The external power supply PS may be a DC power supply. In this case, the power conversion device 20 does not necessarily need to include the fifth switching element Q5 and the sixth switching element Q6. When the positive electrode side of the DC power supply is connected to the input end 21, the negative electrode side of the power supply may be connected to the second input-output line L2. When the negative electrode side of the DC power supply is connected to the input end 21, the positive electrode side of the power supply may be connected to the first input-output line L1.

The power conversion device 20 does not necessarily need to charge the low-voltage battery 12 using the high-voltage battery 11. The voltage of the external power source PS is increased and output to the flying capacitor 33.

The reactor 32 is provided on the side of the external power source PS that corresponds to the first end T1. However, the reactor 32 may be provided on the side corresponding to the second end T2 or both of these. That is, the reactor 32 may be provided on at least one of the first input line L3 and the second input line L4.

The power conversion device 20 may be configured to output power that is input from the high-voltage battery 11 from the input ends 21, 22 as AC power. For example, the control unit 71 alternately switches the switching patterns of the first to sixth switching elements Q1 to Q6 between a ninth pattern and a tenth pattern. The ninth pattern is a switching pattern in which the first switching element Q1 is ON, the second switching element Q2 is ON, the third switching element Q3 is OFF, the fourth switching element Q4 is OFF, the fifth switching element Q5 is OFF, and the sixth switching element Q6 is ON. The tenth pattern is a switching pattern in which the first switching element Q1 is OFF, the second switching element Q2 is OFF, the third switching element Q3 is ON, the fourth switching element Q4 is ON, the fifth switching element Q5 is ON, and the sixth switching element Q6 is OFF.

Figure 17:
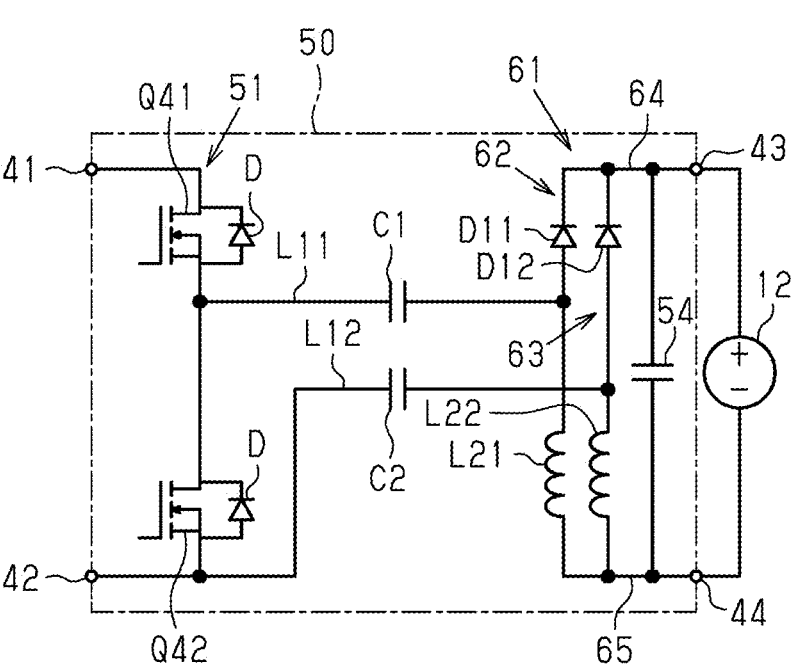
FIG. 17 is a diagram showing a second converter according to another modification.

As shown in FIG. 17, the first coil L21 and the first diode D11 may be replaced with each other, and the second coil L22 and the second diode D12 may be replaced with each other. In this case, the wire 64 is the second wire. The wire 65 is the first wire.

The cathode terminal of the first diode D11 and the cathode terminal of the second diode D12 are electrically connected to the positive output end of the two output ends 43, 44. The anode terminal of the first diode D11 is electrically connected to the first coil L21. The anode terminal of the second diode D12 is electrically connected to the second coil L22. The anode terminal of the first diode D11 and the anode terminal of the second diode D12 are thus electrically connected to the negative output end of the output ends 43, 44 via the coils L21, L22.

The secondary-side circuit 61 may further include a leg. The leg is formed by connecting a coil and a diode in series. In this case, the coil of the added leg is connected to the coils L21, L22 of the legs 62, 63 by the first wire. The diode of the added leg is connected to the diodes D11, D12 of the legs 62, 63 by the second wire.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power conversion device, comprising:
   a primary-side circuit that includes a switching element and is configured to convert power received by a switching operation of the switching element into AC power before outputting the AC power;
   a first connection line and a second connection line;
   a first capacitor provided on the first connection line;
   a second capacitor provided on the second connection line; and a secondary-side circuit configured to convert AC power received from the primary-side circuit into DC power and output the DC power to two output ends, wherein the first connection line and the second connection line each include:

a first end electrically connected to the primary-side circuit; and a second end electrically connected to the secondary-side circuit, the secondary-side circuit includes:

a first leg including a first coil and a first diode, the second end of the first connection line being connected to a first connection point between the first coil and the first diode, the first connection point directly connecting the first coil and the first diode;

a second leg including a second coil and a second diode, the second end of the second connection line being connected to a second connection point between the second coil and the second diode, the second connection point directly connecting the second coil and the second diode;

a first wire that connects the first coil and the second coil to one of the two output ends; and a second wire that connects the first diode and the second diode to the other one of the two output ends, an anode terminal of the first diode and an anode terminal of the second diode are electrically connected to a negative one of the two output ends, a cathode terminal of the first diode is electrically connected to the first coil, and a cathode terminal of the second diode is electrically connected to the second coil.

2. The power conversion device according to claim 1, further comprising:

a flying capacitor; and a step-down circuit that includes a conversion switching element and is configured to control a voltage across the flying capacitor by decreasing a voltage of input power before outputting the input power, wherein the primary-side circuit receives the voltage across the flying capacitor.

3. The power conversion device according to claim 2, wherein the power conversion device is mounted on a vehicle, the step-down circuit receives a voltage from a high-voltage battery, and the secondary-side circuit is configured to output a voltage to a low-voltage battery.

4. A power conversion device, comprising:

a primary-side circuit that includes a switching element and is configured to convert power received by a switching operation of the switching element into AC power before outputting the AC power;

a first connection line and a second connection line;

a first capacitor provided on the first connection line;

a second capacitor provided on the second connection line; and a secondary-side circuit configured to convert AC power received from the primary-side circuit into DC power and output the DC power to two output ends, wherein the first connection line and the second connection line each include:

a first end electrically connected to the primary-side circuit; and a second end electrically connected to the secondary-side circuit, the secondary-side circuit includes:

a first leg including a first coil and a first diode, the second end of the first connection line being connected to a first connection point between the first coil and the first diode, the first connection point directly connecting the first coil and the first diode;

a second leg including a second coil and a second diode, the second end of the second connection line being connected to a second connection point between the second coil and the second diode, the second connection point directly connecting the second coil and the second diode;

a first wire that connects the first coil and the second coil to one of the two output ends; and a second wire that connects the first diode and the second diode to the other one of the two output ends, a cathode terminal of the first diode and a cathode terminal of the second diode are electrically connected to a positive one of the two output ends, an anode terminal of the first diode is electrically connected to the first coil, and an anode terminal of the second diode is electrically connected to the second coil.

5. The power conversion device according to claim 4, further comprising:

a flying capacitor; and a step-down circuit that includes a conversion switching element and is configured to control a voltage across the flying capacitor by decreasing a voltage of input power before outputting the input power, wherein the primary-side circuit receives the voltage across the flying capacitor.

6. The power conversion device according to claim 5, wherein the power conversion device is mounted on a vehicle, the step-down circuit receives a voltage from a high-voltage battery, and the secondary-side circuit is configured to output a voltage to a low-voltage battery.

* * * * *